(12) United States Patent
Zhou et al.

(10) Patent No.: US 11,987,363 B2
(45) Date of Patent: May 21, 2024

(54) ANTI-CRASH HELICOPTER SEAT INTEGRATING MULTIPLE PROTECTIONS

(71) Applicant: AEROSPACE LIFE-SUPPORT INDUSTRIES LTD, Hubei (CN)

(72) Inventors: Haibo Zhou, Hubei (CN); Lingjie Wang, Hubei (CN); Mengmeng Xue, Hubei (CN); Wuming Ma, Hubei (CN); Fushuai Wang, Hubei (CN); Zhen He, Hubei (CN); Junjie Li, Hubei (CN); Wen Xi, Hubei (CN)

(73) Assignee: AEROSPACE LIFE-SUPPORT INDUSTRIES LTD, Hubei (CN)

( * ) Notice: Subject to any disclaimer, the term of this patent is extended or adjusted under 35 U.S.C. 154(b) by 0 days.

(21) Appl. No.: 17/767,930

(22) PCT Filed: Sep. 30, 2020

(86) PCT No.: PCT/CN2020/119576
§ 371 (c)(1),
(2) Date: May 31, 2022

(87) PCT Pub. No.: WO2021/068845
PCT Pub. Date: Apr. 15, 2021

(65) Prior Publication Data
US 2023/0391453 A1    Dec. 7, 2023

(30) Foreign Application Priority Data

Oct. 11, 2019  (CN) .......................... 201910961311.7
Oct. 11, 2019  (CN) .......................... 201921692461.4

(51) Int. Cl.
*B64D 11/06* (2006.01)

(52) U.S. Cl.
CPC ........ *B64D 11/0619* (2014.12); *B64D 11/062* (2014.12); *B64D 11/0633* (2014.12); *B64D 11/0689* (2013.01)

(58) Field of Classification Search
CPC .. B64D 11/0619; B64D 11/062; B64D 25/06; B64D 25/04
See application file for complete search history.

(56) References Cited

U.S. PATENT DOCUMENTS 4,523,730 A * 6/1985 Martin ................... B64D 25/04
                                                  297/216.13
2018/0361984 A1   12/2018 Lin et al.

FOREIGN PATENT DOCUMENTS

CN    101272937    9/2008
CN    106275456    1/2017
(Continued)

OTHER PUBLICATIONS

"International Search Report (Form PCT/ISA/210) of PCT/CN2020/119576," mailed on Dec. 31, 2020, with English translation thereof, pp. 1-6.

*Primary Examiner* — Philip J Bonzell
*Assistant Examiner* — Eric Acosta
(74) *Attorney, Agent, or Firm* — JCIPRNET

(57) ABSTRACT

An anti-crash helicopter seat integrating multiple protections, including a main framework, a weighing sensor, a magnetorheological damper system, an upper body forced tensioning and quick disengagement system, a seat pan, a multifunctional vest and a controller, wherein the seat pan is slidably connected with the main framework in a vertical direction, the magnetorheological damper system is fixedly arranged on the seat pan and is connected with the main framework by the weighing sensor, the upper body forced tensioning and quick disengagement system is arranged on the seat pan, the multifunctional vest is connected with the (Continued)

seat pan by the upper body forced tensioning and quick disengagement system, and the controller is connected with the weighing sensor and the magnetorheological damper system respectively.

8 Claims, 4 Drawing Sheets

(56) References Cited

FOREIGN PATENT DOCUMENTS

| | | | | | |
|---|---|---|---|---|---|
| CN | 106275456 | A | * | 1/2017 | ............. B64D 25/06 |
| CN | 108928316 | | | 12/2018 | |
| CN | 109703762 | | | 5/2019 | |
| CN | 109703762 | A | * | 5/2019 | |
| CN | 208842635 | | | 5/2019 | |
| CN | 110606207 | | | 12/2019 | |
| CN | 210793658 | | | 6/2020 | |
| GB | 2097732 | A | * | 11/1982 | ............. B64D 25/16 |

* cited by examiner

ANTI-CRASH HELICOPTER SEAT INTEGRATING MULTIPLE PROTECTIONS

CROSS-REFERENCE TO RELATED APPLICATION

This application is a 371 of international application of PCT application serial no. PCT/CN2020/119576, filed on Sep. 30, 2020, which claims the priority benefit of China application no. 201910961311.7 and 201921692461.4, filed on Oct. 11, 2019. The entirety of each of the above mentioned patent applications is hereby incorporated by reference herein and made a part of this specification.

FIELD

The present disclosure relates to the technical field of aviation equipment, in particular to an anti-crash helicopter seat integrating multiple protections.

BACKGROUND

At present, domestic anti-crash helicopter seats adopt a fixed load energy absorption technology, but the fixed load energy absorption technology can only provide optimal protection for a pilot with a specific weight (the weight of the 50th percentile pilot is generally adopted in order to exert the maximum efficiency within the weight range of the pilot), and is less effective for protection for too light or too heavy pilots; for a heavy pilot, the pilot moves downwards at a deceleration less than an expected deceleration, which may lead to an insufficient impact stroke, thereby causing secondary collision; and a light pilot cannot fully utilize the effective impact stroke, and may suffer from a higher deceleration impact than the expected impact, exceeding the tolerance of a human body. Therefore, in order to ensure that an energy absorption device provides optimal overload protection for all pilots when a helicopter crashes, the limited space below the seat is utilized more reasonably, and a self-adaptive stepless variable-load energy absorption technology is adopted.

Due to the demands of a modernized battlefield, the helicopter develops in a direction of high speed, high maneuverability and high stealth. At present, a five-point safety belt with an inertia locking function is generally adopted by an anti-crash helicopter seat to control the accidental beating action of a pilot, and although such a restraint mode can effectively protect the pilot under a normal flight overload, the protection on the pilot is not so effective, due to the defects that the slack of a woven tape is large, and a certain response delay exists in locking of an inertia spool of a shoulder strap under the high-overload crash working condition. An upper body forced tensioning technology is adopted, so that the pilot can pull back the upper body forcibly in any posture, the back of the pilot is kept to be tightly attached to the backrest, thereby guaranteeing that the pilot is in an optimal posture to improve the survivability of the pilot.

In the future, battlefield environments are complex and changeable, tasks are often executed in complex environments such as an enemy-occupied area, a sparsely populated desert, a jungle or a wide water area, and the anti-crash helicopter seat is required to provide more comprehensive protection when meeting all-region and all-environment battle requirements. From the perspective of improving the survivability of the pilot, only the consideration of the life safety of the pilot under the crash working condition is not enough, and the demands on survival and help seeking of the pilot after the helicopter lands (falls into water) need also to be considered.

SUMMARY

The technical problem to be solved by the present disclosure is that for the above defects in the prior art, the present disclosure provides an anti-crash helicopter seat integrating multiple protections, which has excellent anti-crash and protection performance, provides optimal protection for all percentile occupants, enables a pilot to keep an optimal posture to prevent secondary collision, has a quick disengagement function, can achieve one-key unlocking, and meets lifesaving demands of the pilot in various complex environments after a crash.

In order to solve the above technical problem, a technical solution adopted by the present disclosure is as follows.

An anti-crash helicopter seat integrating multiple protections includes: a main framework, a weighing sensor, a magnetorheological damper system, an upper body forced tensioning and quick disengagement system, a seat pan, a multifunctional vest and a controller, wherein the seat pan is slidably connected with the main framework in a vertical direction, the magnetorheological damper system is fixedly arranged on the seat pan, and is connected with the main framework by the weighing sensor, the upper body forced tensioning and quick disengagement system is arranged on the seat pan, the multifunctional vest is connected with the seat pan by the upper body forced tensioning and quick disengagement system, and the controller is connected with the weighing sensor and the magnetorheological damper system respectively.

According to the above technical solution, the magnetorheological damper system includes a high-strength woven tape, a damper and a connecting shaft, wherein one end of the high-strength woven tape is wound on the connecting shaft of the damper, the other end of the high-strength woven tape is connected with the weighing sensor, and the weighing sensor is fixedly arranged on the main framework.

According to the above technical solution, the damper is a magnetorheological damper.

According to the above technical solution, the upper body forced tensioning and quick disengagement system includes a quick disengagement handle, a lower connecting rod, a lower transfer block, a switching rod, a multifunctional transfer block, pull rods, lower lock rods, compression springs, a steel cable, an upper switching block, an upper connecting rod, upper transfer blocks, upper lock rods, shoulder strap tensioning belts and a shoulder strap tensioning mechanism, wherein the lower connecting rod is arranged below the upper connecting rod, the quick disengagement handle is connected with one end of the lower connecting rod, the other end of the lower connecting rod is connected with a lower end of the steel cable, an upper end of the steel cable is connected with the upper switching block, and the upper switching block is connected with the upper connecting rod; and the upper transfer blocks are connected with the upper lock rods, ends of the shoulder strap tensioning belts are connected with the shoulder strap tensioning mechanism, the other ends of the shoulder strap tensioning belts are inserted into lock holes of the upper lock rods, the lower transfer block is arranged on the lower connecting rod in a sleeving manner and connected with the multifunctional transfer block through the switching rod, and the multifunctional transfer block is connected with the lower lock rods through the pull rods, the shoulder strap tensioning belts are connected with an upper end of the multifunctional vest, the lower lock rods are connected with a lower end of the multifunctional vest, the lower lock rods are sleeved with the compression springs, and can automatically reset through the compression springs.

According to the above technical solution, the number of the pull rods and the number of the lower lock rods are both two, ends of the two pull rods are connected with two sides of the multifunctional transfer block respectively, the two lower lock rods are connected with the other ends of the two pull rods respectively, and two sides of the lower end of the multifunctional vest are connected with the two lower lock rods respectively.

According to the above technical solution, the number of the upper transfer blocks and the number of the upper lock rods are both two, the two upper transfer blocks are arranged at two ends of the upper connecting rod in a sleeving manner respectively, the two upper lock rods are connected with the two upper transfer blocks respectively, and two sides of the upper end of the multifunctional vest are connected with the two upper lock rods respectively.

According to the above technical solution, the multifunctional transfer block is arranged on a back of a seat through a rotating shaft, the shoulder strap tensioning mechanism is fixedly arranged on the seat, and the upper connecting rod and the lower connecting rod are arranged at an upper end and a lower end of the seat in a sleeving manner respectively.

According to the above technical solution, the shoulder strap tensioning mechanism is provided with an inertia spool and gas exciting holes, which are integrally designed with the quick disengagement mechanism to save the volume and reduce the weight, so that the shoulder strap tensioning belts are in a tightened state.

According to the above technical solution, the multifunctional vest includes a vest body, wherein an upper end of the vest body is connected with two shoulder strap tightening belts, an upper strap lock catch and tightening belt is connected between the two shoulder strap tightening belts, a lower end of the vest body is connected with two leg straps, leg strap guide rings are arranged on two sides of the vest body, the two leg straps pass through the leg strap guide rings on the corresponding sides respectively, and a leg strap lock catch and tightening belt is connected between the two leg straps.

According to the above technical solution, a seat cushion is arranged on the seat pan, a back cushion is arranged on a backrest of the seat pan, a lifeboat is embedded in the back cushion of the seat, and the main framework is fixedly connected with a cabin.

The seat has the following beneficial effects.

1. The weight of a movable part of the seat and the overload during a crash are detected in real time through the weighing sensor (namely the weight of the movable part of the seat in a normal flight state is automatically detected and the overload during the crash is detected), and the magnetorheological damper system performs self-adaptive adjustment on a damping force according to detection signals of the weighing sensor, serves as a stepless variable-load energy absorber, can change the damping force before the crash and during the crash of the helicopter, has excellent anti-crash performance and protection performance, can provide optimal protection for all percentile occupants, eliminates the influence of other factors such as the weight of equipment and sitting postures on the damping force; and the upper body forced tensioning and quick disengagement system enables a pilot to keep an optimal posture to prevent secondary collision, has a quick disengagement function, can achieve one-key unlocking, and meets lifesaving demands of the pilot in various complex environments after the crash.

2. The life-saving equipment and the seat are integrated, so that the weight of the seat can be greatly reduced. The lifeboat is used as a part of the backrest and is not placed below the seat pan, so that the impact stroke is released.

Figure 1:
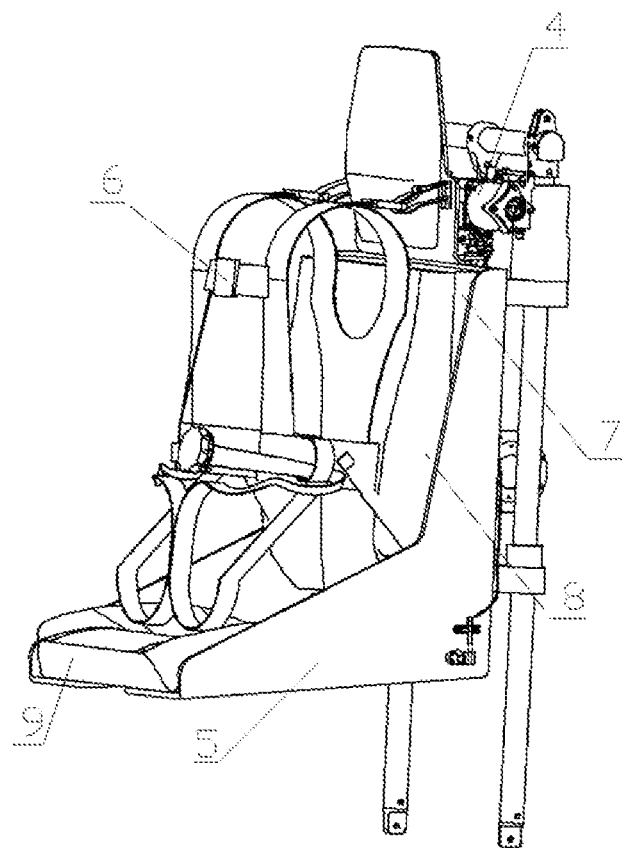
FIG. 1 is a front axis view of an anti-crash helicopter seat integrating multiple protections in an embodiment of the present disclosure.
Figure 2:
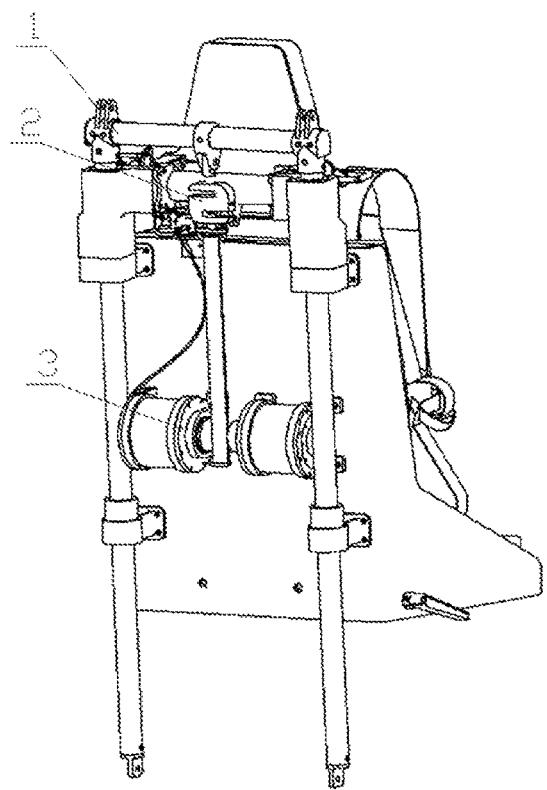
FIG. 2 is a back axis view of an anti-crash helicopter seat integrating multiple protections in an embodiment of the present disclosure.

In the drawings, 1—main framework, 2—weighing sensor;
- 3—magnetorheological damper system, 301—high-strength woven tape, 302—damper, 303—connecting shaft, 304—input current line;
- 4—upper body forced tensioning and quick disengagement system, 401—quick disengagement handle, 402—lower connecting rod, 403—lower transfer block, 404—switching rod, 405—multifunctional transfer block, 406—pull rod, 407—lower lock rod, 408—compression spring, 409—steel cable, 410—upper switching block, 411—upper connecting rod, 412—upper transfer block, 413—upper lock rod, 414—shoulder strap tensioning belt, 415—shoulder strap tensioning mechanism, 416—gas exciting hole;
- 5—seat pan, 6—multifunctional vest, 601—vest body, 602—pulley, 603—leg strap, 604—leg strap guide ring, 605—upper strap lock catch and tightening belt, 606—leg strap lock catch and tightening belt, 607—shoulder strap connecting piece, 608—shoulder strap tightening belt, 609—waist strap and waist strap tightening belt;
- 7—single-person lifeboat, 8—back cushion, 9—seat cushion.

DETAILED DESCRIPTION OF THE EMBODIMENTS

The present disclosure is described in detail in combination with accompanying drawings and embodiments.

Referring to FIG. 1-FIG. 6, an anti-crash helicopter seat integrating multiple protections in an embodiment provided by the present disclosure includes a main framework 1, a weighing sensor 2, a magnetorheological damper system 3, an upper body forced tensioning and quick disengagement system 4, a seat pan 5, a multifunctional vest 6, a controller, etc., wherein the main framework 1 is connected and fixed to a cabin, the seat pan 5 is slidably connected with the main framework 1 in a vertical direction, the magnetorheological damper system 3 is fixedly arranged on the seat pan 5, and is connected with a cross brace of the main framework 1 by the weighing sensor 2, the upper body forced tensioning and quick disengagement system 4 is arranged on the seat pan 5, the multifunctional vest 6 is connected with the seat pan 5 by the upper body forced tensioning and quick disengagement system 4, and the controller is connected with the weighing sensor 2 and the magnetorheological damper system 3 respectively.

Further, the seat has an excellent anti-crash function, can adjust occupants to be in an optimal anti-crash posture during a crash, and meanwhile, is equipped with a single-person lifeboat 7 to achieve maritime lifesaving, the weighing sensor 2 can automatically obtain the real-time weights of the occupants and equipment, the real-time weights serve as input signals of a stepless variable-load energy absorber, and a damping force can be subjected to self-adaptive adjustment, so that the influence of other factors such as the weight of the equipment and sitting postures on the damping force is eliminated.

Further, the magnetorheological damper system 3 includes a high-strength woven tape 301, a damper 302 and a connecting shaft 303, wherein one end of the high-strength woven tape 301 is wound on the connecting shaft 303 of the damper 302, the other end of the high-strength woven tape 301 is connected with the weighing sensor 2, and the weighing sensor 2 is fixedly arranged on a cross brace of the main framework 1.

Further, the damper 302 is a magnetorheological damper 302; and the damper 302 is connected with the controller through an input current line 304.

Further, the magnetorheological damper system 3 serves as a stepless variable-load energy absorber, the damping force of the damper 302 can be changed by changing input current of the magnetorheological damper, and the magnetorheological damper is applied to the anti-crash seat, so that optimal protection can be provided for all percentile occupants. Meanwhile, the magnetorheological damper is quick in response, and the damping force can be changed in a self-adaptive manner before the crash and during the crash of the helicopter.

Further, the upper body forced tensioning and quick disengagement system 4 includes a quick disengagement handle 401, a lower connecting rod 402, a lower transfer block 403, a switching rod 404, a multifunctional transfer block 405, pull rods 406, lower lock rods 407, compression springs 408, a steel cable 409, an upper switching block 410, an upper connecting rod 411, upper transfer blocks 412, upper lock rods 413, shoulder strap tensioning belts 414, a shoulder strap tensioning mechanism 415 and gas exciting holes 416, wherein the lower connecting rod 402 is arranged below the upper connecting rod 411, the quick disengagement handle 401 is connected with one end of the lower connecting rod 402, the other end of the lower connecting rod 402 is connected with a lower end of the steel cable 409, an upper end of the steel cable 409 is connected with the upper switching block 410, and the upper switching block 410 is connected with the upper connecting rod 411; and the upper transfer blocks 412 are connected with the upper lock rods 413, ends of the shoulder strap tensioning belts 414 are connected with the shoulder strap tensioning mechanism 415, the other ends of the shoulder strap tensioning belts 414 are inserted into lock holes of the upper lock rods 413, the lower transfer block 403 is arranged on the lower connecting rod 402 in a sleeving manner and connected with the multifunctional transfer block 405 through the switching rod 404, and the multifunctional transfer block 405 is connected with the lower lock rods 407 through the pull rods 406, the shoulder strap tensioning belts 414 are connected with an upper end of the multifunctional vest 6, the lower lock rods 407 are connected with a lower end of the multifunctional vest 6, the lower lock rods are sleeved with the compression springs, and can automatically reset through the compression springs 408, and when the quick disengagement handle 401 is not in operation, the compression springs 408 enable mechanisms to restore an original state, and the compression springs are connected with the seat pan.

Further, the quick disengagement handle 401 drives the lower connecting rod 402 to rotate, the lower connecting rod 402 rotates to drive the multifunctional transfer block 405 to rotate through the lower transfer block 403, and further a lower lock body is driven to be unlocked through the pull rods 406, and waist strap and waist strap tightening belts 609 are released; the lower connecting rod 402 rotates and meanwhile drives the steel cable 409 to be pulled downwards, the steel cable 409 is pulled downwards to drive the upper connecting rod 411 to rotate through the upper switching block 410, and the upper connecting rod 411 rotates to drive the upper transfer blocks 412 to rotate, so that the upper lock rods 413 are driven to move downwards, and the shoulder strap tensioning belts 414 are released.

Further, the upper switching block 410 is arranged on the upper connecting rod 411 in a sleeving manner, a fixed pulley or a sleeve hole is fixedly arranged on one side of the upper switching block 410, an upper end of the steel cable 409 bypasses the fixed pulley or passes through the sleeve hole and the upper switching block 410, and the upper switching block 410 drives the upper connecting rod 411 to rotate.

Further, the number of the pull rods 406 and the number of the upper lock rods 413 are both two, ends of the two pull rods 406 are connected with two sides of the multifunctional transfer block 405 respectively, the two lower lock rods 407 are connected with the other ends of the two pull rods 406 respectively, and two sides of the lower end of the multifunctional vest 6 are connected with the two lower lock rods 407 respectively.

Further, the number of the upper transfer blocks 412 and the number of the upper lock rods 413 are both two, the two upper transfer blocks 412 are arranged at two ends of the upper connecting rod 411 in a sleeving mode respectively, the two upper lock rods 413 are connected with the two upper transfer blocks 412 respectively, and two sides of the upper end of the multifunctional vest 6 are connected with the two upper lock rods 413 respectively.

Further, the multifunctional transfer block 405 is arranged on a back of the seat pan through a rotating shaft, the shoulder strap tensioning mechanism 415 is fixedly arranged on the seat, and the upper connecting rod 411 and the lower connecting rod 402 are arranged at an upper end and a lower end of the seat pan in a sleeving manner respectively.

Further, the upper connecting rod 411 and the lower connecting rod 402 both transversely penetrate through the upper end and the lower end of the seat pan in a sleeving manner.

Further, the shoulder strap tensioning mechanism 415 is provided with an inertia spool and gas exciting holes 416, which are integrally designed with the quick disengagement mechanism to save the volume and reduce the weight, so that the shoulder strap tensioning belts 414 are in a natural tightened state, and the shoulder strap tensioning belts 414 can be forcibly retracted by exciting the gas exciting holes 416.

Further, the multifunctional vest 6 includes a vest body 601, wherein an upper end of the vest body 601 is connected with two shoulder strap tightening belts 608, an upper strap lock catch and tightening belt 605 is connected between the two shoulder strap tightening belts, a lower end of the vest body 601 is connected with two leg straps, leg strap guide rings 604 are arranged on two sides of the vest body 601, the two leg straps pass around the thighs to pass through the leg strap guide rings 604 on the corresponding sides respectively, and a leg strap lock catch and tightening belt 606 is connected between the two leg straps.

Further, the vest body 601 is connected with shoulder strap connecting pieces 607, pulleys 602 are arranged on the shoulder strap connecting pieces 607, the ends of the shoulder strap tensioning belts 414 are connected with the shoulder strap tensioning mechanism 415, and the other ends of the shoulder strap tensioning belts 414 bypass the pulleys 602 to be inserted into the lock holes of the upper lock rods 413. A five-point safety belt is replaced by the multifunctional vest 6 to facilitate quick disengagement, and occupants can wear the multifunctional vest 6 to normally escape from a helicopter.

Further, an upper body forced tensioning mechanism enables a pilot to keep an optimal posture during the crash to prevent secondary collision. A powder-driven shoulder strap forced tensioning mechanism is adopted to guarantee that the forced pulling-back time of the upper body meets the requirement; and the shoulder strap tensioning mechanism 415 can be triggered in a manner that an overload starting device senses emergency landing of the helicopter.

By operating the quick disengagement handle 401, a quick disengagement function is achieved, and one-key unlocking can be achieved.

Further, a seat cushion 9 is arranged on the seat pan 5, a back cushion 8 is arranged on a backrest of the seat, and a single-person lifeboat 7 is embedded into the back cushion 8 of the seat. The single-person lifeboat 7 is embedded into the back cushion 8 of the seat, serves as a part of the backrest and is not placed below the seat pan 5, so that the impact stroke is released, and the demands of the occupants for survival on water and help seeking are met.

The working principle of the present disclosure is as follows.

As shown in FIG. 1, an anti-crash helicopter seat integrating multiple protections mainly includes a main framework 1, a weighing sensor 2, a magnetorheological damper system 3, an upper body forced tensioning and quick disengagement system 4, a seat pan 5, a multifunctional vest 6, a single-person lifeboat 7, a back cushion 8 and a seat cushion 9. The main framework 1 is of a main structure of a seat and is connected with a cabin of a helicopter. One end of the weighing sensor 2 is connected to a cross brace of the main framework 1, the other end of the weighing sensor 2 is connected with a high-strength woven tape 301 on the magnetorheological damper system 3, an upper body forced tensioning and quick disengagement system 4 is fixed to the seat pan 5, and the single-person lifeboat 7 is located between the back cushion 8 and the seat pan 5 after being folded. A force route is as follows: overload is sequentially transmitted from the cross brace of the main framework 1 to the weighing sensor 2, the magnetorheological damper system 3 and the seat pan 5, wherein the magnetorheological damper system 3 is a rotary damper magnetorheological coil. During the crash, the upper body forced tensioning and quick disengagement system 4, the seat pan 5, the multifunctional vest 6, the single-person lifeboat 7, the back cushion 8 and the seat cushion 9 can freely slide up and down along the main framework 1, the magnetorheological damper system 3 rotates, and the high-strength woven tape 301 rotates and extends.

As shown in FIG. 1, during normal flight, normal riding requirements are provided for a pilot, and when the helicopter bumps or has overload in deceleration and is in maneuvering flight, the upper body forced tensioning and quick disengagement system 4 provides necessary constraints for the pilot, thereby preventing structural parts of the helicopter from beating and collision; during emergency landing, the magnetorheological damper system 3 can attenuate the load transmitted to the body of the pilot to reduce the damage of the load to the pilot to the maximum extent, and the upper body forced tensioning and quick disengagement system 4 and the multifunctional vest 6 can reliably restrain the pilot. After the helicopter lands stably, the pilot pulls a quick disengagement handle 401 to quickly disengage the connection between the multifunctional vest 6 and the upper body forced tensioning and quick disengagement system 4 as well as the seat pan 5, so that the pilot can quickly evacuate. In water area and field environments, the single-person lifeboat 7 or the like may be used to fight for rescue time, so that the survival rate is increased. In conclusion, the anti-crash seat has multiple protection functions, can be suitable for complex environments and can complete multiple task systems.

Figure 3:
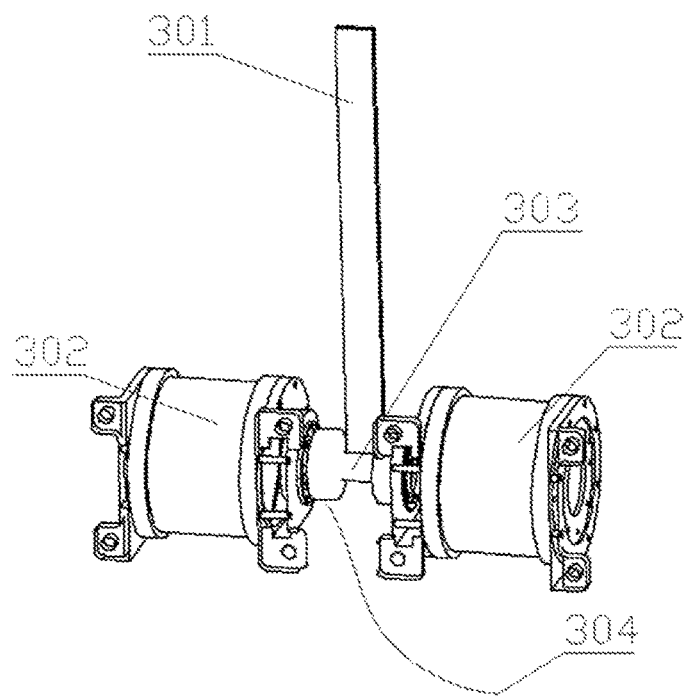
FIG. 3 is a schematic structural diagram of a magnetorheological damper system in an embodiment of the present disclosure.

As shown in FIG. 3, the magnetorheological damper system 3 mainly includes a high-strength woven tape 301, dampers 302, a connecting shaft 303 and an input current line 304. The dampers 302 are rotary dampers and contain magnetorheological liquid, and a damping torque is also increased with the increase of internal current. The two left and right dampers 302 are connected together through the connecting shaft 303, the high-strength woven tape 301 is wound on the connecting shaft 303, and a rotary motion is converted into a linear motion. During the crash of the helicopter, an exposed part of the woven tape 301 is increased, that is, the number of turns of the woven tape 301 on the connecting shaft 303 is reduced. Different magnitudes of current in the input current line 304 correspond to different magnitudes of the damping force, so that the magnetorheological damper is a stepless variable-load energy absorber. Besides, the magnetorheological damper has the capability of quick response, only 8 ms is required from the input of current to the acquisition of a stable damping force, in consideration of other influence factors such as a control strategy and line transmission, the whole process from a crash working condition judgment to damping force stabilization can be completed within 10 ms-20 ms, and the time for the seat of the helicopter to respond to the crash is 50 ms-100 ms, so that the damping force can be adjusted for two times or more during the crash.

Figure 4:
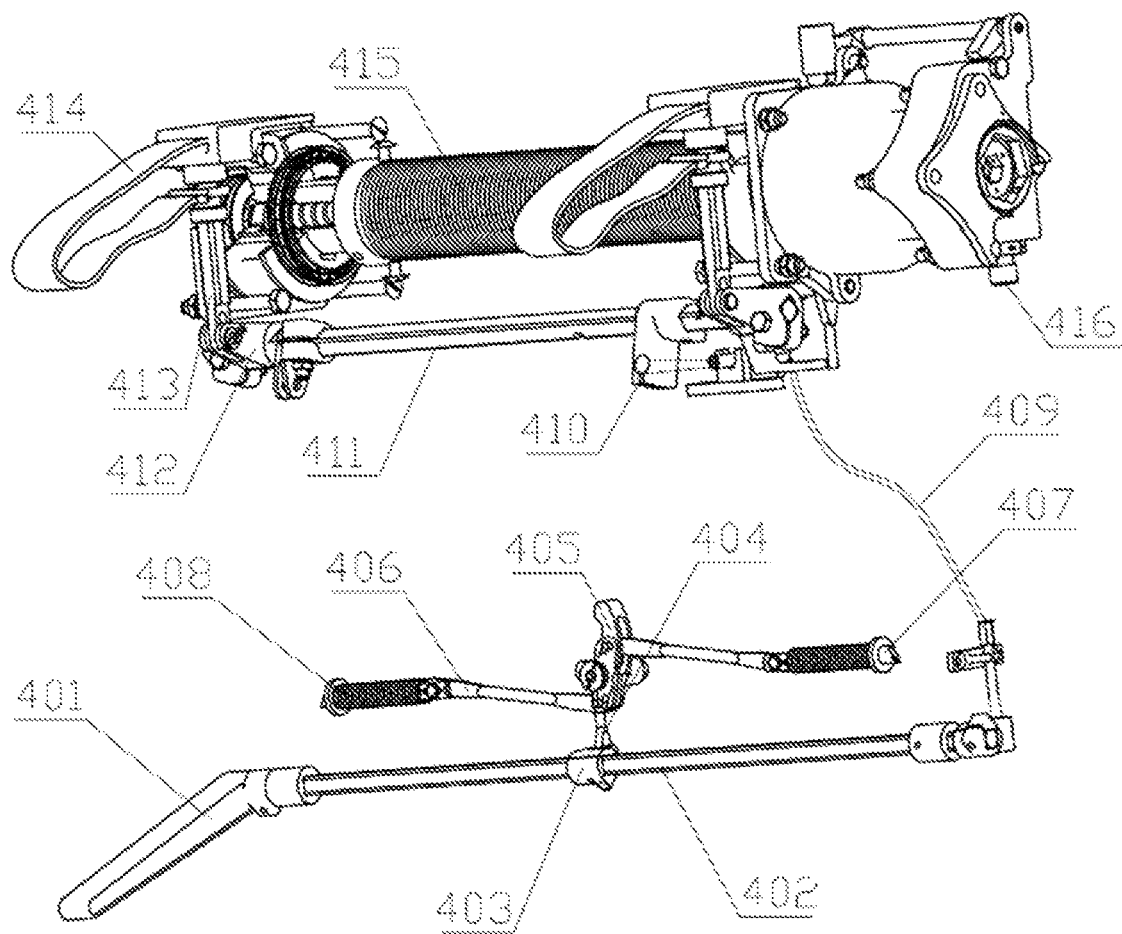
FIG. 4 is a structural schematic diagram of an upper body forced tensioning and quick disengagement system in an embodiment of the present disclosure.

As shown in FIG. 4, the upper body forced tensioning and quick disengagement system 4 mainly includes a quick disengagement handle 401, a lower connecting rod 402, a lower transfer block 403, a switching rod 404, a multifunctional transfer block 405, pull rods 406, lower lock rods 407, compression springs 408, a steel cable 409, an upper switching block 410, an upper connecting rod 411, upper transfer blocks 412, upper lock rods 413, shoulder strap tensioning belts 414, a shoulder strap tensioning mechanism 415 and gas exciting holes 416. In the normal use process, the shoulder strap tensioning belts 414 are inserted into lock holes of the upper lock rods 413, the shoulder strap tensioning mechanism 415 contains an inertia spool, and therefore the shoulder strap tensioning belts 414 are in a natural tightened state. During emergency disengagement, the quick disengagement handle 401 needs to be pulled upwards to drive the lower connecting rod 402 to rotate clockwise, the switching rod 404 moves downwards under the action of the lower transfer block 403, so that the multifunctional transfer block 405 is driven to rotate anticlockwise, the pull rods 406 are pulled towards the center, and finally, the lower lock rods 407 act towards the center to achieve unlocking of a waist strap. Meanwhile, when the lower connecting rod 402 rotates clockwise, the steel cable 409 is pulled, so that the upper switching block 410 and the upper connecting rod 411 rotate anticlockwise, and the upper lock rods 413 move downwards through the upper switching block 410 and the upper connecting rod 411, so that the shoulder strap tensioning belts 414 are loosened. The compression springs 408 are located on the lower lock rods 407, and when the handle is not in operation, the compression springs enable all the mechanisms to restore an original state. When the quick disengagement handle 401 is pulled upwards, the lower lock rods 407 and the upper lock rods 413 move at the same time and are unlocked at the same time, and when the quick disengagement handle 401 is released, the lower lock rods 407 and the upper lock rods 413 are locked at the same time. The gas exciting holes 416 can be connected with a gas pipeline, when a crash occurs, a jettison device excites a gas bomb to produce gas, and after the gas reaches the gas exciting holes 416, the shoulder strap tensioning mechanism 415 is forcibly excited.

Figure 5:
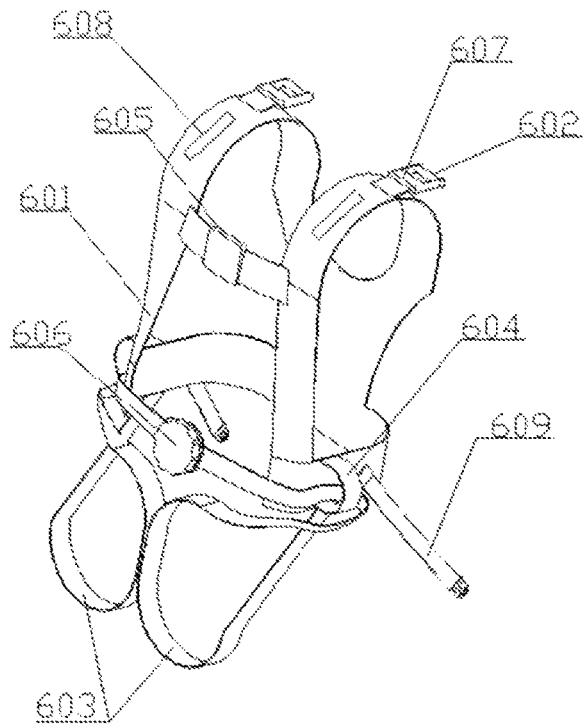
FIG. 5 is a structural schematic diagram of a multifunctional vest in an embodiment of the present disclosure.
Figure 6:
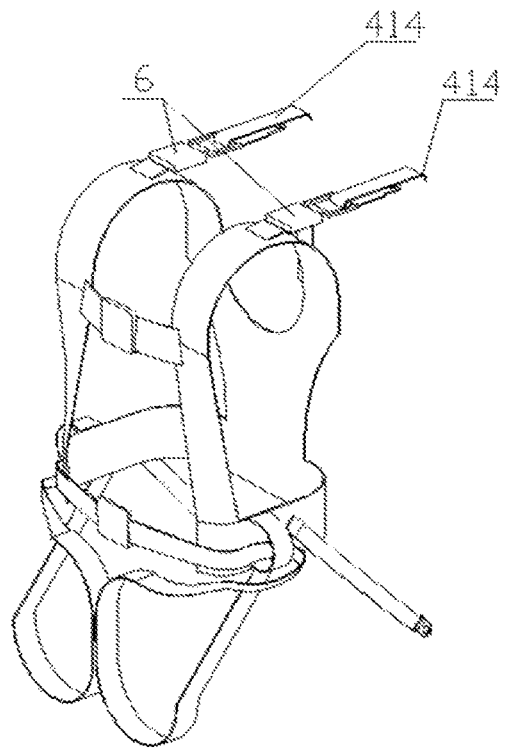
FIG. 6 is a schematic diagram of connection between the multifunctional vest and the upper body forced tensioning and quick disengagement system in an embodiment of the present disclosure.

As shown in FIG. 5, the multifunctional vest 6 mainly includes a vest body 601, pulleys 602, leg straps 603, leg strap guide rings 604, an upper strap lock catch and tightening belt 605, a leg strap lock catch and tightening belt 606, shoulder strap connecting pieces 607, shoulder strap tightening belts 608 and waist strap and waist strap tightening belts 609. The steps for wearing of a pilot are as follows: the legs of a wearer pass through the leg straps 603, then the leg straps 603 pass through the leg strap guide rings 604, and in the leg strap lock catch and tightening belt 606, a lock catch is locked, and a tightening belt is tightened; then in the upper strap lock catch and tightening belt 605, an upper shoulder strap lock catch is locked, and a tightening belt is tightened; and finally, the shoulder strap tightening belts 608 are tightened to finish the wearing. Reverse operations are carried out to complete the disengagement steps. A connecting manner of the multifunctional vest and a seat system is as shown in FIG. 6, the shoulder strap tensioning belts 414 are inserted into the upper lock rods 413 around the pulleys 602, and the waist strap and waist strap tightening belts 609 are inserted into the lower lock rods 407. When the quick disengagement handle 401 is pulled upwards, the multifunctional vest 6 can be completely disengaged from the seat, and a quick escape function is achieved.

In conclusion, the present disclosure aims to provide the anti-crash helicopter seat integrating multiple protections to overcome the defects in the above background. The seat is provided with a self-adaptive energy absorption device that enables the self-adaptive adjustment of energy absorption working load according to changes in the weight center of the seat system, causing optimal protection for all percentile occupants. Meanwhile, the seat is integrated with an individual protection device, and is provided with a shoulder strap forced tensioning mechanism, so that the survivability of the pilot under the crash working condition is improved. Through the upper body tensioning mechanism, the back of the pilot is tightly attached to the backrest during the crash to maintain the optimal posture. Through the integration of the lifesaving device and the seat, the lifesaving demands of the pilot in various complex environments after the crash can be met; and the self-adaptive energy absorption device adopts an energy absorption device based on a magnetorheological technology, and compared with a traditional energy absorption device based on a material plastic deformation technology, has the advantages that instantaneous dynamic response of the energy absorption working load during the crash can be achieved. The magnetorheological damper has the advantages of continuously adjustable damping force, fast response (millisecond level), high failure safety, low energy consumption and the like, and can be used as a stepless variable-load energy absorber for the anti-crash helicopter seat. The weighing sensor 2 is arranged on the back of the seat, and can monitor the weight of a human body in real time, and the damping force is adjusted through a certain control algorithm, so that self-adaptive stepless variable load energy absorption is achieved, the optimal protection can be provided for all the percentile occupants, and the damping force can be changed in a self-adaptive manner before the crash and during the helicopter. The shoulder strap forced tensioning mechanism is mainly based on the mature technology of an ejection seat, and the powder-driven shoulder strap forced tensioning mechanism is adopted to guarantee that the forced pull-back time of the upper body meets the requirement; the shoulder strap tensioning mechanism 415 can be triggered in the manner that the overload starting device senses emergency landing of the helicopter; the seat adopts the integration technology of the restraint device and the multifunctional lifesaving vest and the integration technology of the back cushion of the seat and the single-person lifeboat 7, so that the integrated design of the seat and the individual protection device is achieved. The weight of the seat can be greatly reduced, and meanwhile, the lifesaving demands of the pilot in the various complex environments after the crash can be met.

The above are only the preferred embodiments of the present disclosure, of course, cannot limit the scope of the claims of the present disclosure, and therefore, the equivalent changes made according to the scope of the patent application of the present disclosure still belong to the protection scope of the present disclosure.

What is claimed is:

1. An anti-crash helicopter seat integrating multiple protections, comprising a main framework, a weighing sensor, a magnetorheological damper system, an upper body forced tensioning and quick disengagement system, a seat pan, a multifunctional vest and a controller, wherein the seat pan is slidably connected with the main framework in a vertical direction, the magnetorheological damper system is fixedly arranged on the seat pan, and is connected with the main framework by the weighing sensor, the upper body forced tensioning and quick disengagement system is arranged on the seat pan, the multifunctional vest is connected with the seat pan by the upper body forced tensioning and quick disengagement system, and the controller is connected with the weighing sensor and the magnetorheological damper system respectively, wherein the upper body forced tensioning and quick disengagement system comprises a quick disengagement handle, a lower connecting rod, a lower transfer block, a switching rod, a multifunctional transfer block, pull rods, lower lock rods, compression springs, a steel cable, an upper switching block, an upper connecting rod, upper transfer blocks, upper lock rods, shoulder strap tensioning belts and a shoulder strap tensioning mechanism, wherein the lower connecting rod is arranged below the upper connecting rod, the quick disengagement handle is connected with one end of the lower connecting rod, the other end of the lower connecting rod is connected with a lower end of the steel cable, an upper end of the steel cable is connected with the upper switching block, and the upper switching block is connected with the upper connecting rod; and the upper transfer blocks are connected with the upper lock rods, ends of the shoulder strap tensioning belts are connected with the shoulder strap tensioning mechanism, the other ends of the shoulder strap tensioning belts are inserted into lock holes of the upper lock rods, the lower transfer block is arranged on the lower connecting rod in a sleeving manner and connected with the multifunctional transfer block through the switching rod, and the multifunctional transfer block is connected with the lower lock rods through the pull rods, the shoulder strap tensioning belts are connected with an upper end of the multifunctional vest, the lower lock rods are connected with a lower end of the multifunctional vest, the lower lock rods are sleeved with the compression springs, and can automatically reset through the compression springs.

2. The anti-crash helicopter seat integrating multiple protections according to claim 1, wherein the magnetorheological damper system comprises a high-strength woven tape, a damper and a connecting shaft, one end of the high-strength woven tape is wound on the connecting shaft of the damper, the other end of the high-strength woven tape is connected with the weighing sensor, and the weighing sensor is fixedly arranged on the main framework.

3. The anti-crash helicopter seat integrating multiple protections according to claim 2, wherein the damper is a magnetorheological damper.

4. The anti-crash helicopter seat integrating multiple protections according to claim 1, wherein the number of the pull rods and the number of the lower lock rods are both two, ends of the two pull rods are connected with two sides of the multifunctional transfer block respectively, the two lower lock rods are connected with the other ends of the two pull rods respectively, and two sides of the lower end of the multifunctional vest are connected with the two lower lock rods respectively.

5. The anti-crash helicopter seat integrating multiple protections according to claim 1, wherein the number of the upper transfer blocks and the number of the upper lock rods are both two, the two upper transfer blocks are arranged at two ends of the upper connecting rod in a sleeving manner respectively, the two upper lock rods are connected with the two upper transfer blocks respectively, and two sides of the upper end of the multifunctional vest are connected with the two upper lock rods respectively.

6. The anti-crash helicopter seat integrating multiple protections according to claim 1, wherein the multifunctional transfer block is arranged on a backrest of the seat pan through a rotating shaft, the shoulder strap tensioning mechanism is fixedly arranged on the seat pan, and the upper connecting rod and the lower connecting rod are arranged at an upper end and a lower end of the seat pan in a sleeving manner respectively.

7. The anti-crash helicopter seat integrating multiple protections according to claim 1, wherein the multifunctional vest comprises a vest body, an upper end of the vest body is connected with two shoulder strap tightening belts, an upper strap lock catch and tightening belt is connected between the two shoulder strap tightening belts, a lower end of the vest body is connected with two leg straps, leg strap guide rings are arranged on two sides of the vest body, the two leg straps pass through the leg strap guide rings on the corresponding sides respectively, and a leg strap lock catch and tightening belt is connected between the two leg straps.

8. The anti-crash helicopter seat integrating multiple protections according to claim 1, wherein a seat cushion is arranged on the seat pan, a back cushion is arranged on the backrest of the seat pan, a lifeboat is embedded in the back cushion of a seat, and the main framework is connected and fixed to a cabin.

\* \* \* \* \*